US007051558B2

(12) United States Patent
Mathers

(10) Patent No.: US 7,051,558 B2
(45) Date of Patent: May 30, 2006

(54) ANTI-THEFT DEVICE FOR EQUIPMENT

(76) Inventor: Robert Mathers, 9411 SW. 185 Ter., Miami, FL (US) 33157

( * ) Notice: Subject to any disclaimer, the term of this patent is extended or adjusted under 35 U.S.C. 154(b) by 0 days.

(21) Appl. No.: 11/115,255

(22) Filed: Apr. 27, 2005

(65) Prior Publication Data

US 2005/0193781 A1 Sep. 8, 2005

Related U.S. Application Data

(63) Continuation-in-part of application No. 10/938,547, filed on Sep. 13, 2004, which is a continuation-in-part of application No. 10/441,075, filed on May 20, 2003, now Pat. No. 6,789,405.

(51) Int. Cl.
*E05B 73/00* (2006.01)
*B60R 25/00* (2006.01)

(52) U.S. Cl. .................... 70/14; 70/18; 70/58; 70/209; 70/232; 70/237

(58) Field of Classification Search ...................... 70/2, 70/14, 18, 19, 58, 232, 181, 182, 158–169, 70/209, 237, 238
See application file for complete search history.

(56) References Cited

U.S. PATENT DOCUMENTS

| | | | | |
|---|---|---|---|---|
| 3,391,555 | A * | 7/1968 | Mamo | 70/258 |
| 3,678,717 | A * | 7/1972 | Eaton | 70/232 |
| 4,325,701 | A * | 4/1982 | Peters et al. | 440/113 |
| 4,407,146 | A * | 10/1983 | Nielsen, Jr. | 70/232 |
| 4,502,306 | A | 3/1985 | Scammacca | 70/159 |
| 5,101,647 | A | 4/1992 | Johnston | 70/199 |
| 5,113,674 | A | 5/1992 | LiCausi | 70/209 |
| 5,794,462 | A | 8/1998 | Steele et al. | 70/18 |
| 6,202,453 | B1 * | 3/2001 | Disher et al. | 70/14 |
| 6,212,920 | B1 | 4/2001 | Winner | 70/38 C |
| 6,427,496 | B1 * | 8/2002 | Hurst | 70/14 |
| 6,539,757 | B1 | 4/2003 | Witchey | 70/202 |
| 6,789,405 | B1 * | 9/2004 | Mathers | 70/14 |
| 2005/0225067 | A1 * | 10/2005 | Nguyen | 280/767 |

* cited by examiner

*Primary Examiner*—Suzanne Dino Barrett
(74) *Attorney, Agent, or Firm*—Richard C. Litman

(57) ABSTRACT

An anti-theft device for deterring unauthorized operation of a designated vehicle control adjunct. The device is adapted to secure the designated control to prevent manipulation thereof. The device includes a clevis pin, a clevis and a padlock and a hasp. The hasp is secured directly to a permanent planar surface of the vehicle.

13 Claims, 8 Drawing Sheets

ANTI-THEFT DEVICE FOR EQUIPMENT

CROSS-REFERENCE TO RELATED APPLICATIONS

This application is a continuation-in-part of prior application Ser. No. 10/938,547 filed Sep. 13, 2004, which is a continuation-in-part of prior application Ser. No. 10/441,075 filed May 20, 2003 now U.S. Pat. No. 6,789,405 B1.

BACKGROUND OF THE INVENTION

1. Field of the Invention

The present invention generally relates to security devices. More specifically, the present invention is drawn to an anti-theft device for securing vehicle operating controls and personal equipment.

2. Description of the Related Art

Theft and/or unauthorized use of outdoor recreational equipment, marine, construction and lawn gear is a major problem for the owners. Equipment that must be left outdoors has no adequate means of theft protection. Aside from the temporary or permanent loss of the equipment or gear, the cost of repairs and subsequent rise in insurance rates can create a major financial burden. There are many patents in the related art drawn to anti-theft devices examples of which are identified and cited in the accompanying IDS. However, none of the above inventions and patents, taken either singly or in combination, is seen to disclose an anti-theft device as will be subsequently described and claimed herein.

SUMMARY OF THE INVENTION

The instant invention is an anti-theft device for deterring unauthorized operation of designated equipment control adjuncts. The device is adapted to secure the designated control to prevent manipulation thereof. Consisting of only a clevis pin, a clevis and a padlock, the device is compact in design and easy to use. A uniquely designed hasp is employed to accomplish proper attachment of the anti-theft device. The hasp is secured directly to a permanent planar surface of the equipment. The clevis pin and clevis are removable from the hasp and can be conveniently stored or transported to be used elsewhere.

Accordingly, the instant invention presents an anti-theft device, which device is fabricated from rugged material and provides improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 6:
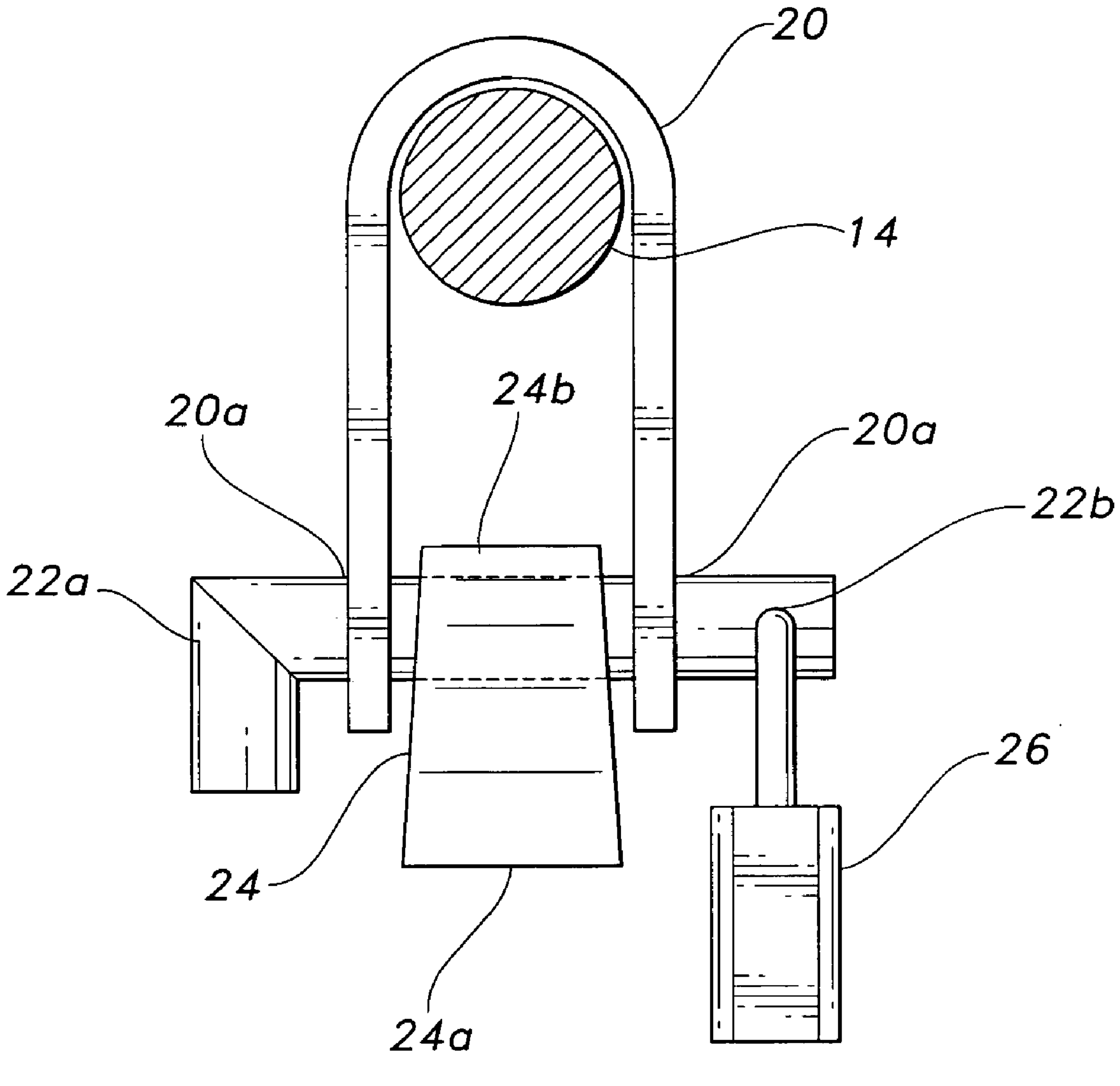
FIG. 6 is a front view of a first embodiment of the anti-theft device according to the present invention.

Attention is first directed to FIG. 6, which shows the first embodiment of the anti-theft device of the instant invention generally at 10. The anti-theft device 10 comprises a U-shaped clevis 20, a clevis pin 22, a hasp 24 and a padlock 26. At its distal end 22*a*, pin 22 terminates in an L-shaped configuration. Openings 20*a* are formed through the clevis 20 adjacent each end thereof. An opening 22*b* is formed through the pin adjacent the proximate end thereof. Hasp 24 is adapted to have its base 24*a* securely attached to a vehicle substrate. The attachment may be accomplished in any convenient manner (screws, rivets, pins, welds, etc.). Hasp 24 is solid except for an opening 24*b* formed therethrough.

Figure 7:
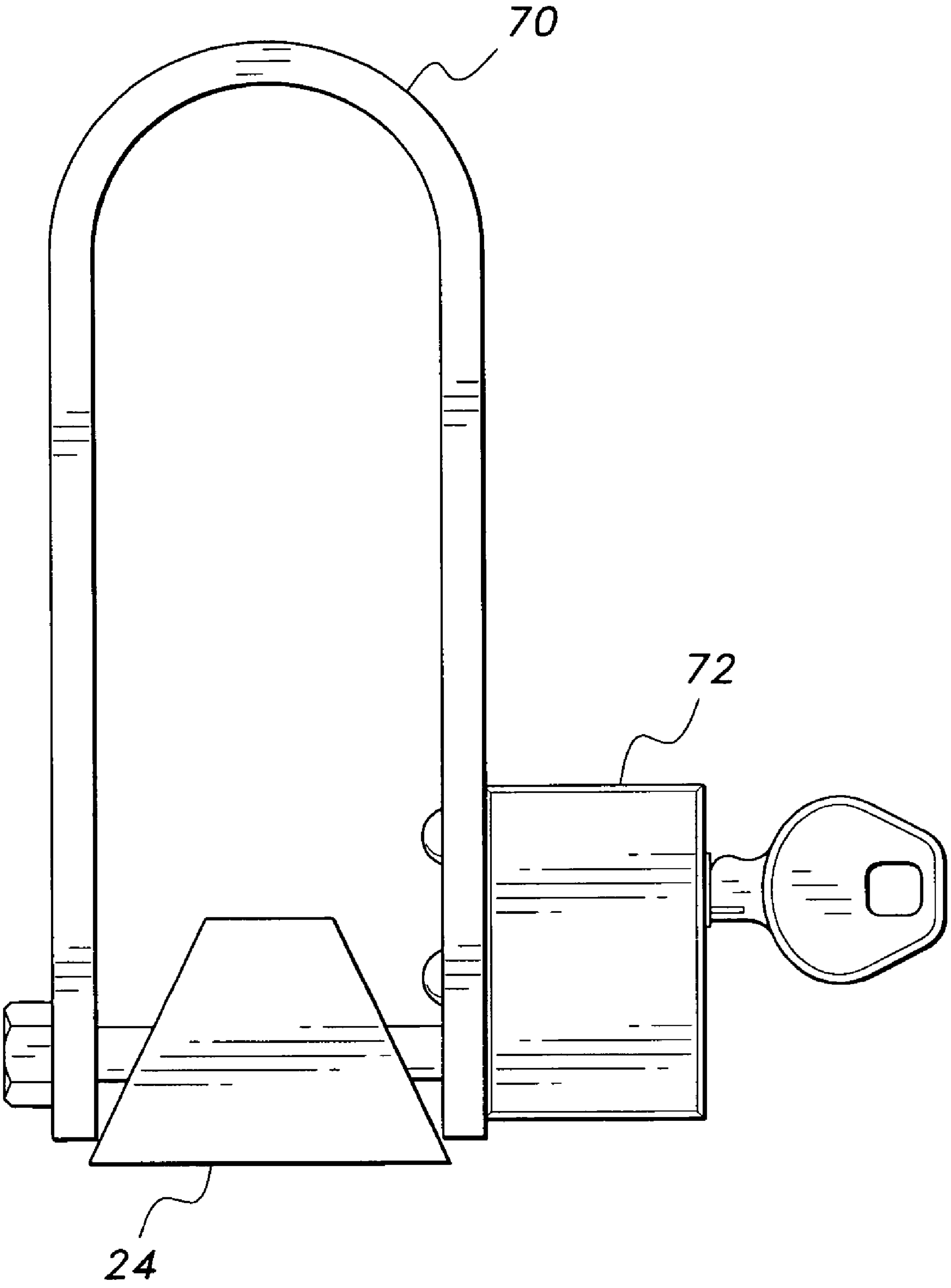
FIG. 7 is a front view of a second embodiment of the anti-theft device according to the present invention.
Figure 8:
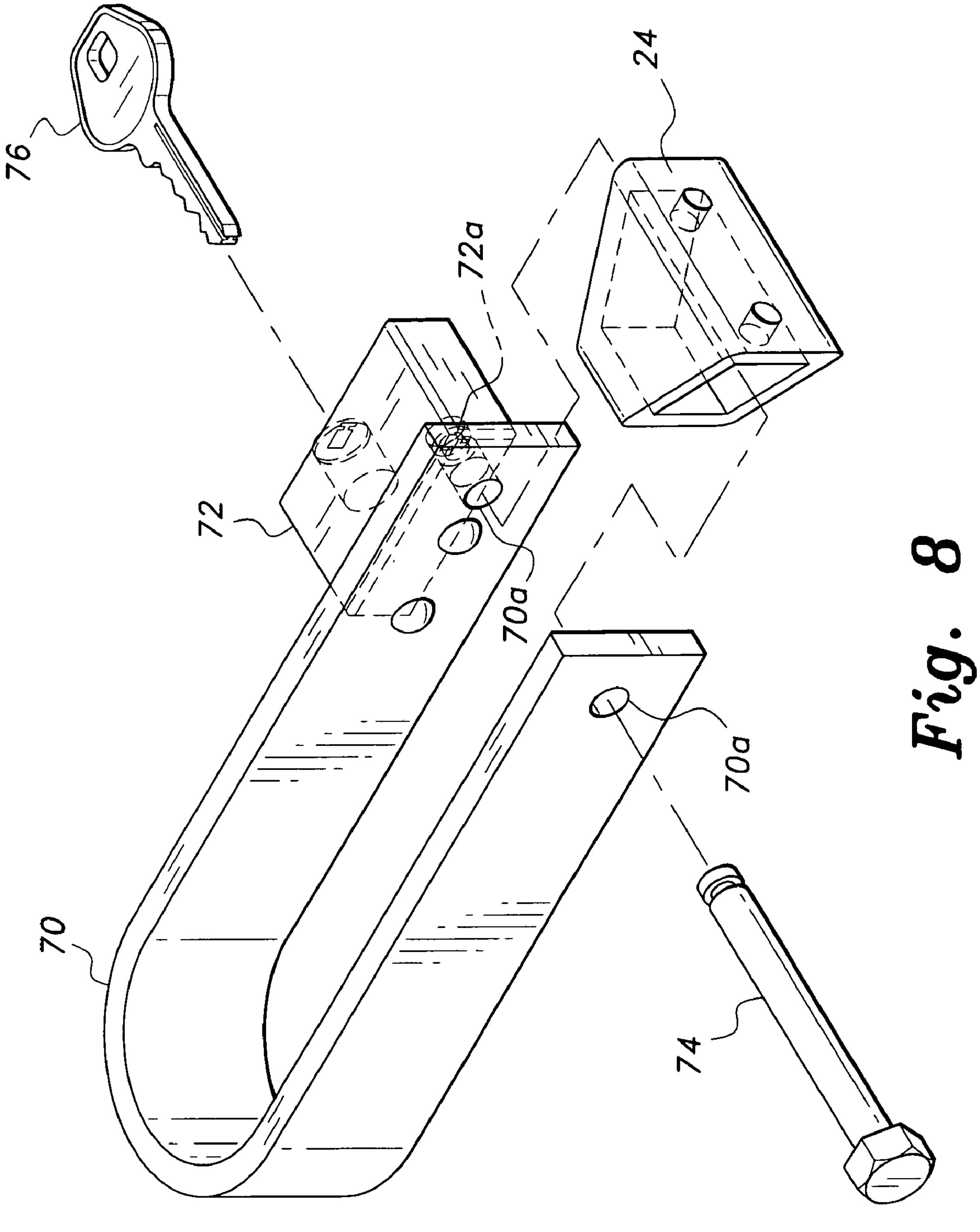
FIG. 8 is an exploded, perspective view of a second embodiment of the anti-theft device according to the present invention.

A second embodiment of the anti-theft device is illustrated in FIGS. 7 and 8. The U-shaped clevis 70 and lock 72 are permanently attached. The attachment can be effected in any conventional manner (screws, rivets, welds, etc.). Lock 72 is provided with an opening 72*a* therein, which opening is in axial alignment with openings 70*a* in the U-shaped clevis member. Clevis pin 74 is adapted for insertion through a first opening 70*a*, hasp 24, a second opening 70*a* and into opening 72*a* in lock 72. Clevis pin 74 is formed with a cap at its distal end. A lock notch is positioned adjacent the proximate end. A key 76 is insertable into lock 72 to secure the clevis pin 74. A pair of openings is formed through the base of hasp 24 whereby the hasp can be attached to a substrate.

The clevis member, clevis pin and hasp can be fabricated from a variety durable metal stock having chemical and/or corrosion resistant coatings. However, it is recognized that a plastic material may be utilized if suitable.

Figure 1:
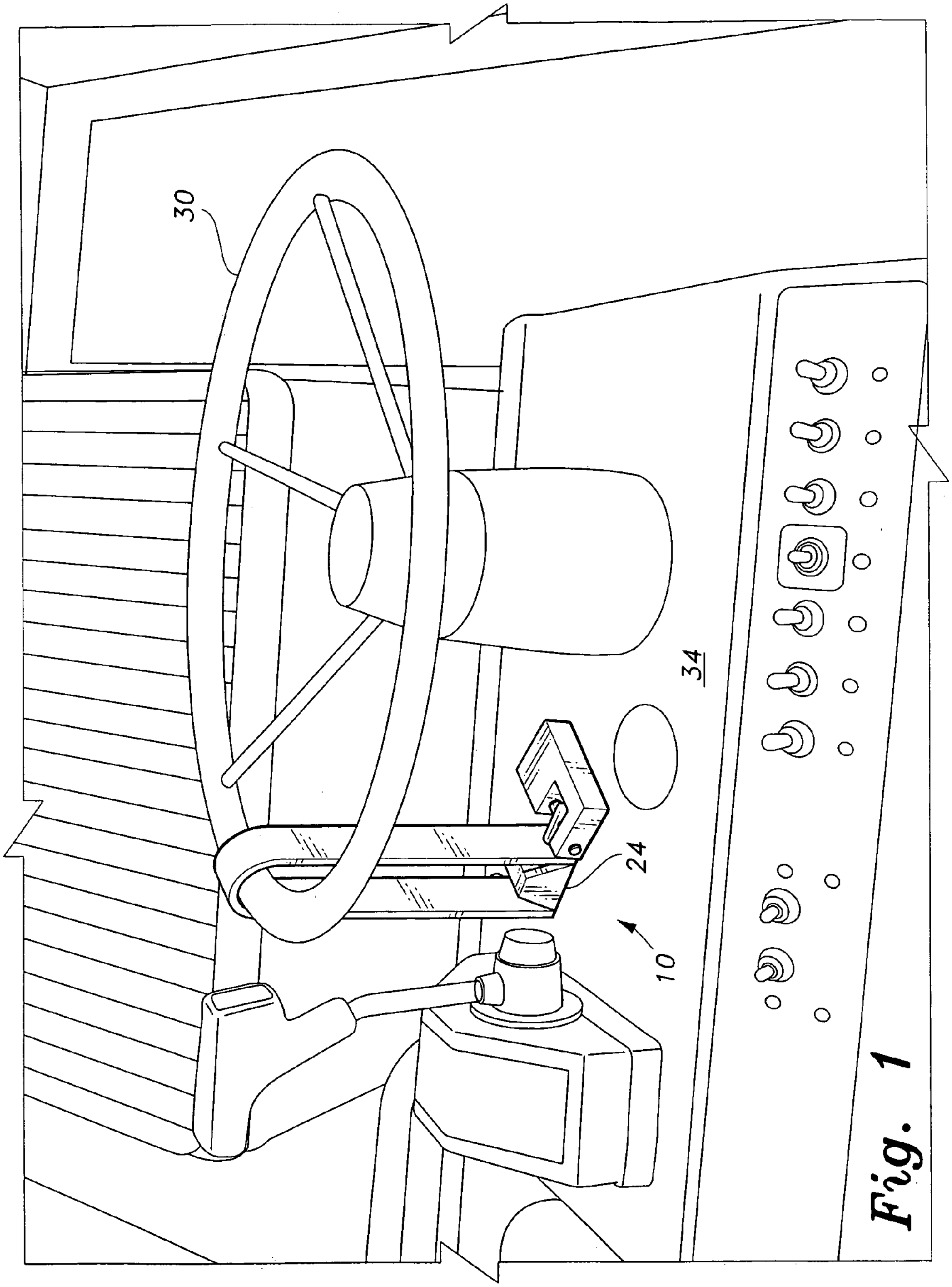
FIG. 1 is an environmental, perspective view of a first embodiment of an anti-theft device mounted to the wheel of a boat according to the present invention.
Figure 2:
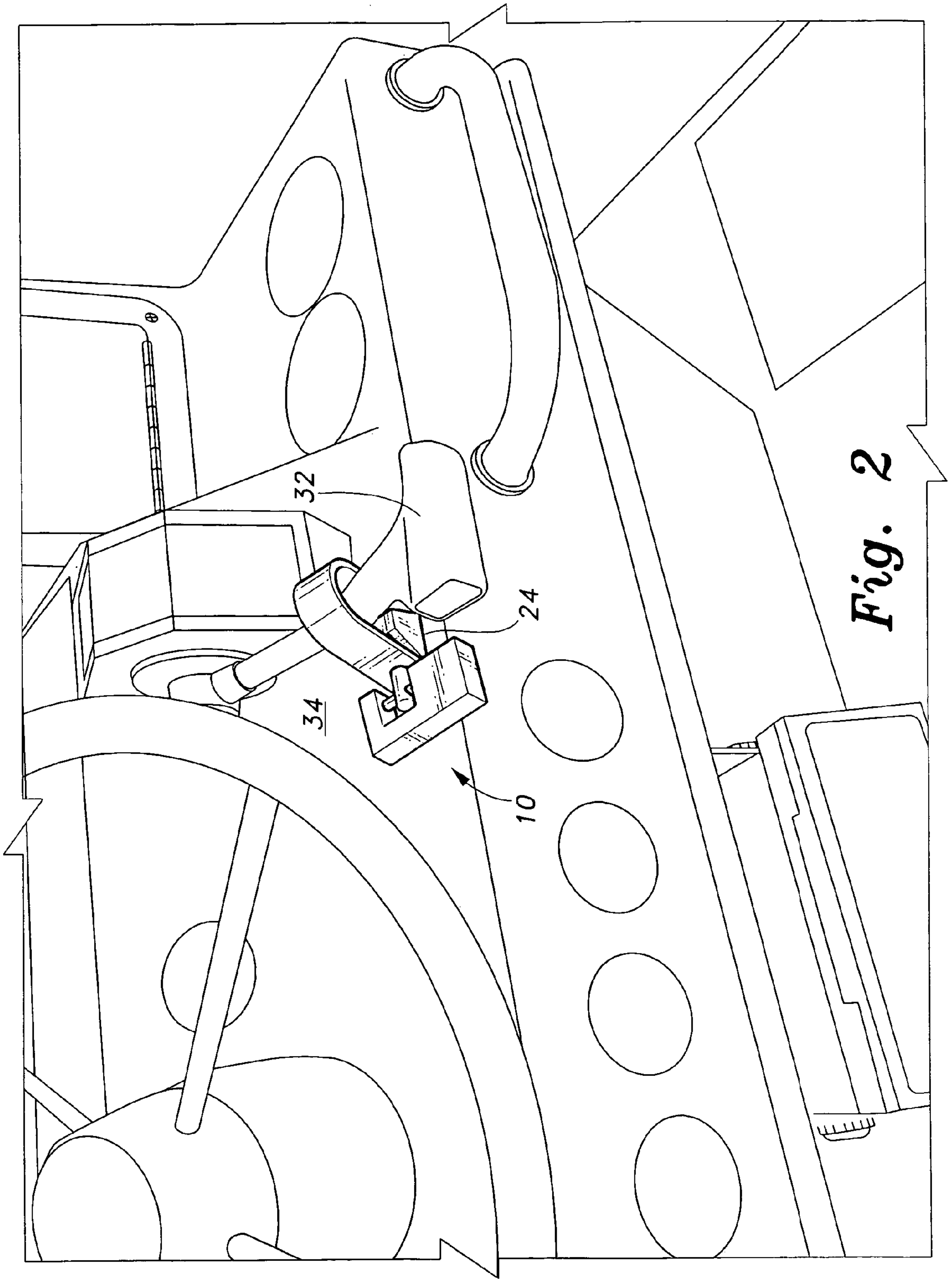
FIG. 2 is an environmental, perspective view of a first embodiment of an anti-theft device mounted to the throttle of a boat according to the present invention.
Figure 3:
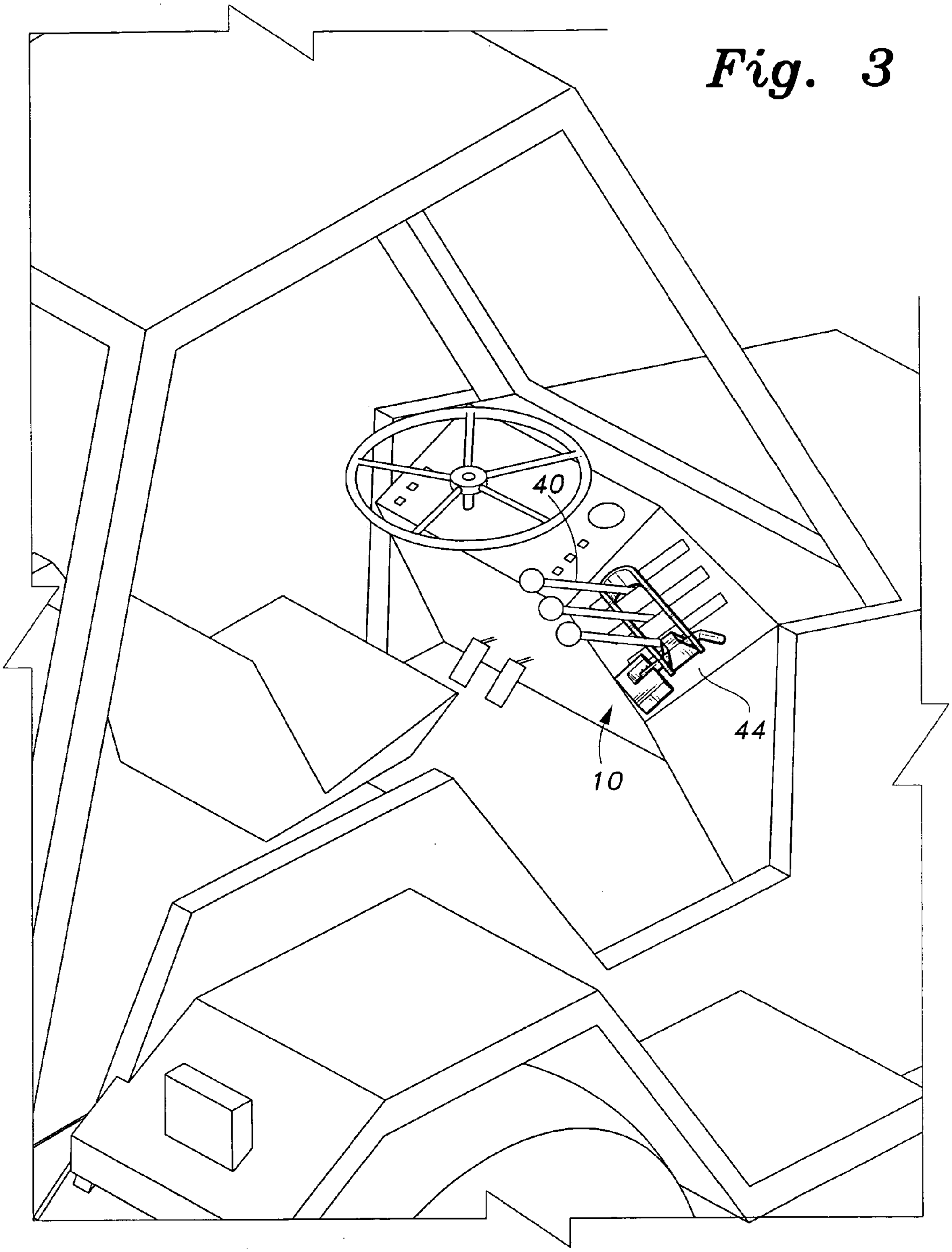
FIG. 3 is an environmental, perspective view of a first embodiment of an anti-theft device mounted to the control levers of heavy construction equipment according to the present invention.
Figure 4:
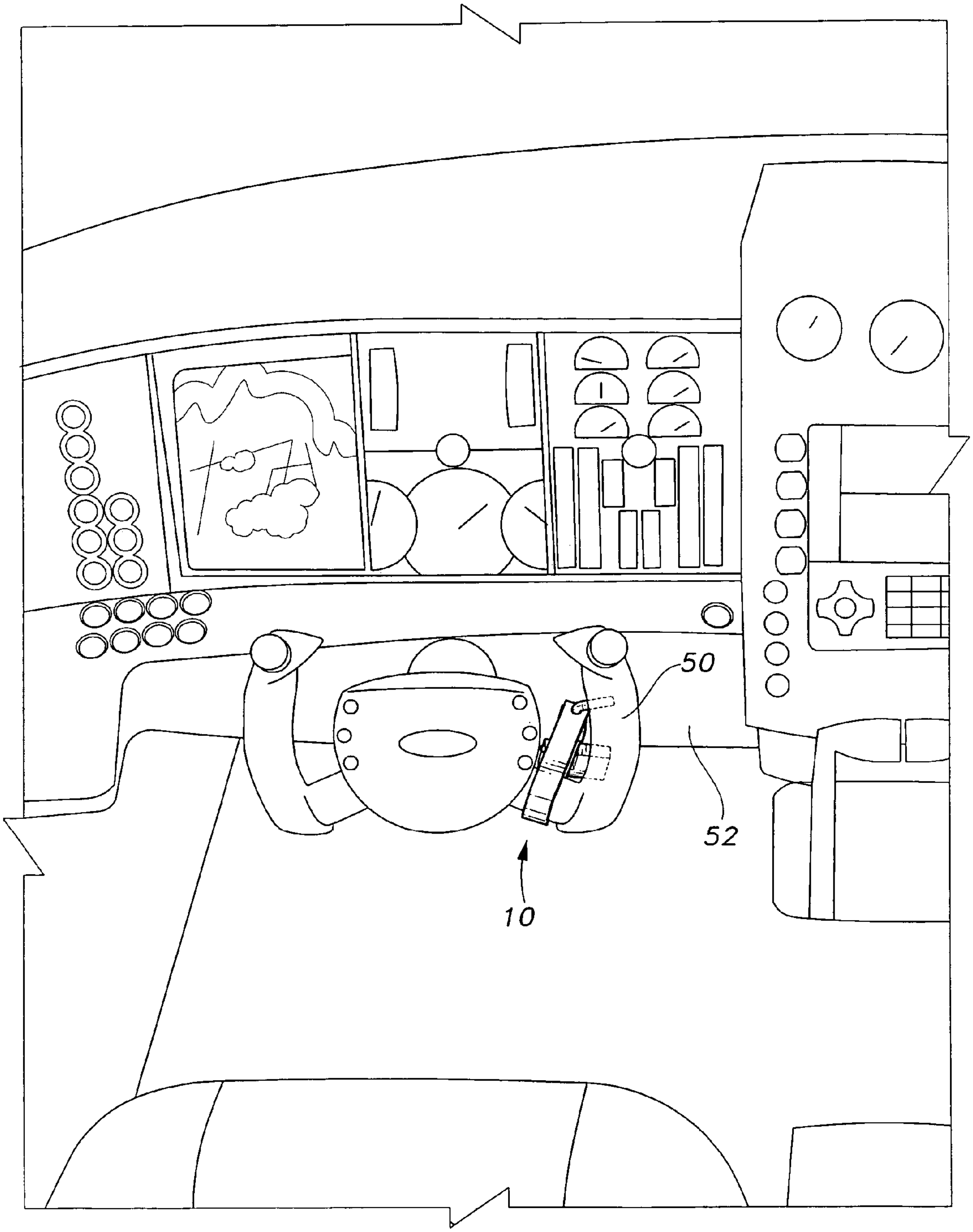
FIG. 4 is an environmental, perspective view of a first embodiment of an anti-theft device mounted to the yoke of an airplane according to the present invention.
Figure 5:
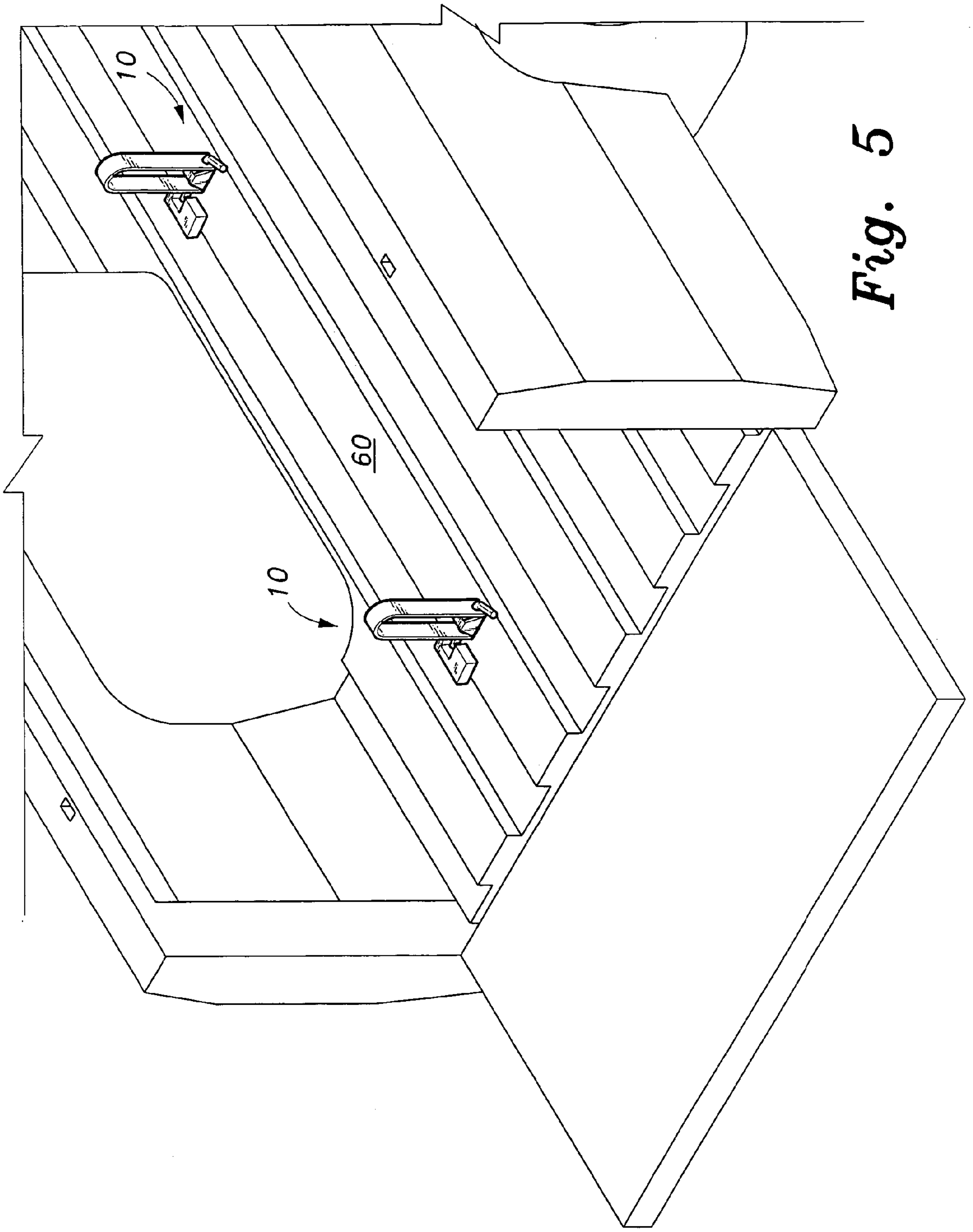
FIG. 5 is an environmental, perspective view of a first embodiment of an anti-theft device mounted to the bed of a pick-up truck according to the present invention.

The anti-theft device of the present invention is effective in almost limitless situations to effectively deter tampering with a designated control adjunct. FIGS. 1–6 respectively illustrate only a few of the many uses of the invention. In FIGS. 1 and 2 the clevis is respectively disposed around the wheel 30 and the throttle 32 of a boat. The hasp 24 is secured in each instance to the boat's control panel 34. FIG. 3 shows the device employed to secure the control levers 40 of heavy construction vehicle such as graders, bulldozers and the like. The hasp may be secured to the wall 44 of the vehicle. In FIG. 4 the yoke 50 of an aircraft is secured and the hasp is mounted on the aircraft's control panel 52. FIG. 5 respectively illustrates the device mounted to the floor 60 of a pick-up truck or the like for securing a bike or lawn equipment and the like.

It is to be understood that the present invention is not limited to the embodiments described above, but encompasses any and all embodiments within the scope of the following claims.

I claim:

1. An anti-theft device, comprising:

a U-shaped clevis member, said clevis member having a first end and a second end;

openings disposed through said clevis member adjacent said first end and said second end;

a clevis pin, said clevis pin having a distal end and a proximate end, said clevis pin adapted to be inserted through said openings in said clevis member;

an opening defined through said clevis pin adjacent said proximate end, said distal end having an L-shaped configuration;

a hasp, said hasp positioned between said first end and said second end of said U-shaped clevis member, said hasp fabricated from a solid stock material and having a base and an opening formed through said hasp, wherein said opening is adapted to receive said clevis pin;

a pair of openings formed through the base of said hasp, whereby said hasp is attachable to a substrate in a vehicle and said U-shaped clevis member is adapted to fit over a vehicle control adjunct; and a padlock adapted to be inserted in said opening defined through said clevis pin.

2. The anti-theft device according to claim 1, wherein said vehicle is a boat, said control adjunct is a steering wheel and said substrate is a panel.

3. The anti-theft device according to claim 1, wherein said vehicle is a boat, said control adjunct is a throttle and said substrate is a panel.

4. The anti-theft device according to claim 1, wherein said vehicle is a bulldozer, said control adjunct is an array of control levers and said substrate is a wall.

5. The anti-theft device according to claim 1, wherein said vehicle is an airplane, said control adjunct is a yoke and said substrate is a panel.

6. An anti-theft device, comprising:

a U-shaped clevis member, said clevis member having a first end and a second end;

openings disposed through said clevis member adjacent said first end and said second end;

a clevis pin, said clevis pin having a distal end and a proximate end, said clevis pin adapted to be inserted through said openings in said clevis member;

a cap defining the distal end of said clevis pin;

a notch formed adjacent said proximate end of said clevis pin;

a hasp, said hasp positioned between said first end and said second end of said U-shaped clevis member, said hasp fabricated from a solid stock material and having an opening formed through said hasp, wherein said opening is adapted to receive said clevis pin;

a pair of openings formed through the base of said hasp, whereby said hasp is attachable to a substrate in a vehicle and said U-shaped clevis member is adapted to fit over a vehicle control adjunct and a lock attached to said U-shaped clevis member, said lock having an opening for receiving the proximate end of said clevis pin therein.

7. The anti-theft device according to claim 6, wherein said lock is attached to one of said first ends and second ends of said U-shaped clevis member.

8. The anti-theft device according to claim 6, wherein said lock is attached to one of said first ends and second ends of said U-shaped clevis member and wherein said opening in said lock is in registration with the respective opening in one of said first ends and second ends.

9. The anti-theft device according to claim 6, wherein said vehicle is a boat, said control adjunct is a steering wheel and said substrate is a panel.

10. The anti-theft device according to claim 6, wherein said vehicle is a boat, said control adjunct is a throttle and said substrate is a panel.

11. The anti-theft device according to claim 6, wherein said vehicle is a bulldozer, said control adjunct is an array of control levers and said substrate is a wall.

12. The anti-theft device according to claim 6, wherein said vehicle is an airplane, said control adjunct is a yoke and said substrate is a panel.

13. The anti-theft device according to claim 6, further including a pick-up truck having a floor for carrying equipment thereon, wherein said base of said hasp is attached to said floor and said U-shaped clevis member fits over the equipment.

* * * * *